United States Patent [19]

Curtis

[11] Patent Number: 4,645,244
[45] Date of Patent: Feb. 24, 1987

[54] AIRCRAFT DUCT GIMBALED JOINT

[76] Inventor: Edwin Curtis, 13815 Whitesail Dr., Victorville, Calif. 92392

[21] Appl. No.: 580,224

[22] Filed: Feb. 15, 1984

[51] Int. Cl.⁴ ............................................. F16L 13/04
[52] U.S. Cl. .................................... 285/114; 285/226; 285/265; 285/301
[58] Field of Search ............... 285/114, 265, 226, 229, 285/300, 301

[56]        References Cited
        U.S. PATENT DOCUMENTS

| | | | |
|---|---|---|---|
| 3,112,129 | 11/1963 | Willis et al. | 285/226 |
| 3,206,229 | 9/1965 | Kramer | 285/114 |
| 3,443,828 | 5/1969 | Hale | 285/266 |
| 3,695,639 | 10/1972 | Shire et al. | 285/114 |
| 3,698,727 | 10/1972 | Greenwald | 277/153 |
| 3,704,034 | 11/1972 | Shire et al. | 285/47 |
| 3,727,951 | 4/1973 | Shire et al. | 285/93 |
| 3,733,092 | 5/1973 | Yorke et al. | 285/116 |
| 3,787,079 | 1/1974 | Yorke et al. | 285/233 |
| 3,796,446 | 3/1974 | Shire et al. | 285/110 |
| 3,821,970 | 7/1974 | Affa | 139/89 |
| 3,907,337 | 9/1975 | Affa | 285/114 |
| 3,915,482 | 10/1975 | Fletcher et al. | 285/226 |
| 4,480,857 | 11/1984 | Gravez | 285/226 X |

FOREIGN PATENT DOCUMENTS 809656  2/1959  United Kingdom ................ 285/226

Primary Examiner—Richard J. Scanlan, Jr.
Attorney, Agent, or Firm—Fulwider, Patton, Rieber, Lee & Utecht

[57]        ABSTRACT

An aircraft duct gimbaled joint is disclosed which permits the ducting to be deflected when high pressure—high temperature gases, vibration and gravitational forces upon take off and during vertical climbs cause substantial expansion and movement. The gimbaled joint comprises two spaced apart end rings, each formed with a pair of perpendicular protruding lobes which are inserted into slots formed in the end face of a center ring. The protruding lobes of the end rings are pivotally connected to the center ring by pivot pins which are doubly supported by the inner and outer walls of the center ring. The lobes of the first end ring are rotated 90 degrees relative to the second end ring providing movement about a vertical and horizontal axis. The rings are sealed by a flexible bellows which fit over and enclose the center ring.

6 Claims, 7 Drawing Figures

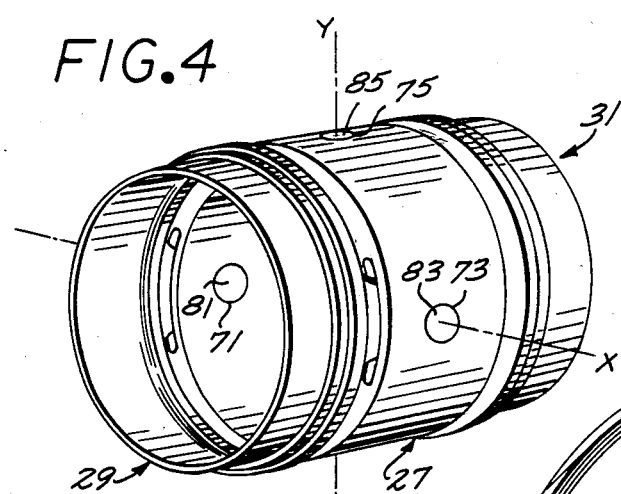
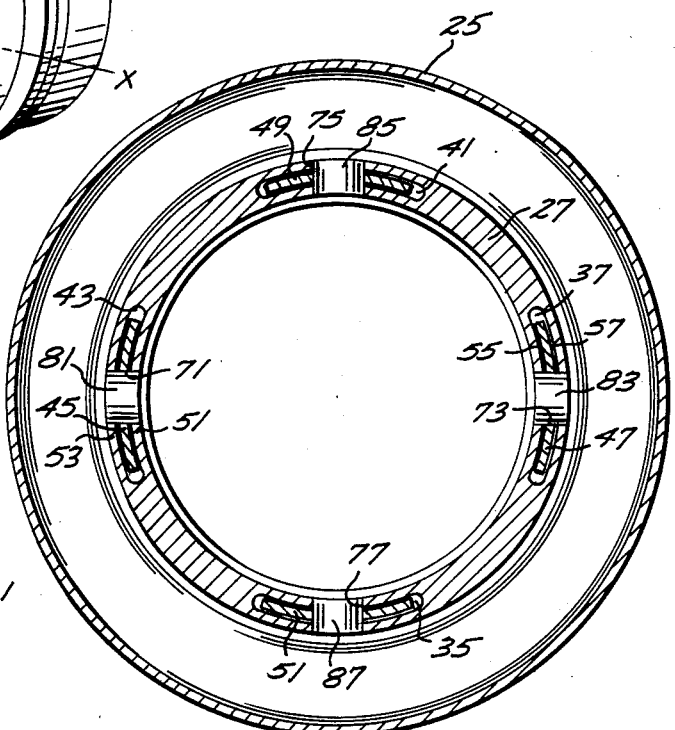
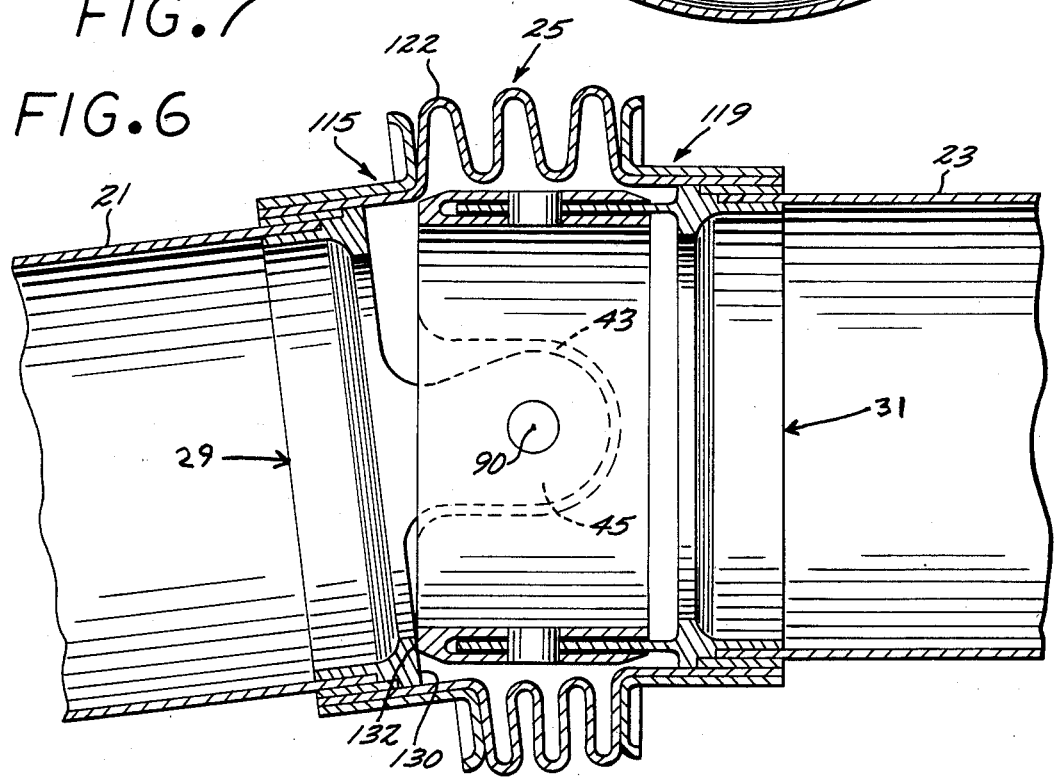

AIRCRAFT DUCT GIMBALED JOINT

BACKGROUND OF THE INVENTION

1. Field of the Invention

The present invention relates generally to duct connectors for aircraft, and specifically to adjustable duct connectors.

2. Description of the Prior Art

With the advent of modern aircraft, the need developed for flexible joint ducting to transport high pressure, high temperature gases, often termed the "bleed air", from the aircraft engine, particularly from a cantilever mounted engine under heavy loads. The temperature differential to which the engine and ducting is subjected, before and after the engine warms up, is approximately 1200 to 1300 degrees Fahrenheit, causing the ducting to undergo considerable thermal growth. In addition, the gravitional forces upon take off, and during vertical climbs, aircraft vibrations and the high pressure operating condition also require a connector which has angular flexibility to prevent breakage from fatigue. Military aircraft, particularly, are subjected to heavy loading such that it is desirable that the ducting have flexible connections.

Flexible ball joints have been disclosed which include spherically concave portions which serve as a socket and a spherically convex portion serving as a ball resting inside the socket. A joint of this type is shown in Affa, U.S. Pat. No. 4,165,107. While serving its intended purpose, a joint of this type suffers the shortcoming that the ball sliding against the socket surface creates a large amount of friction, thus causing substantial premature wear of the components.

Other universal joints have been proposed wherein extensions are pivotally connected to sealing rings by bolts on the interior of aircraft ducting. A joint of this type is shown in Affa, U.S. Pat. No. 3,907,337. However, such a joint suffers the shortcoming that its movement is not sufficiently limited and each pivotal connection is subject to premature fatigue and failure of the joint due to the bending movement and single sided shear force, at the bolt. In addition, substantial friction is created between the spacer rings and the connecting member which serves as a seal causing premature failure of the seal. Moreover, as gases flow through the joint, turbulence is created by the protruding ends of the bolt which form the pivotal connection to the sealing rings.

SUMMARY OF THE INVENTION

Accordingly, it is an object of the present invention to provide a flexible gimbaled joint in which the pivotal connection has increased strength to prevent failure at the pivot point. It is another object of the present invention to provide a means for limiting the amount of deflection thereby preventing an excess of angulation causing early fatigue of components. It is a further object of the present invention to provide a durable seal which will expand upon an increase in pressure. It is still a further object of the present invention to provide a flexible gimbaled joint constructed without protrusions to interrupt the laminar flow of gases through the ducting and which minimizes the turbulence.

The gimbaled joint of the present invention includes a center ring having a pair of diametrically opposed, open-end axial slots formed in the opposite faces of the center ring, such pairs being rotated 90 degrees from one another. End rings are disposed on the opposite side of such center ring and are each formed with axially-protruding lobes projecting, and received in the slots formed in the end faces of the center ring. The protruding lobes of both end rings are pivotally connected to the center ring permitting the end rings to articulate about an orthogonal axis. The confronting faces of the center ring and respective end rings are spaced sufficiently close together to cause such faces to abut upon rotation of such end rings about their respective axes of rotation and thereby limit such rotation. The end rings and the center rings are enclosed by a flexible bellows which expands as the pressure on the interior of the joint increases.

Other objects and features of the invention will become apparent from consideration of the following description taken in connection with the accompanying drawings.

BRIEF DESCRIPTION OF THE DRAWINGS

FIG. 4 is a perspective view of the present invention;

FIG. 5 is a transverse cross-sectional view of the present invention taken along the line 5—5 of FIG. 2;

FIG. 6 is a longitudinal view showing vertical pivoting of the gimbaled joint of the present invention; and FIG. 7 is a transverse cross-sectional view similar to FIG. 5 of a second embodiment of the present invention.

DESCRIPTION OF THE PREFERRED EMBODIMENT

Figure 1:
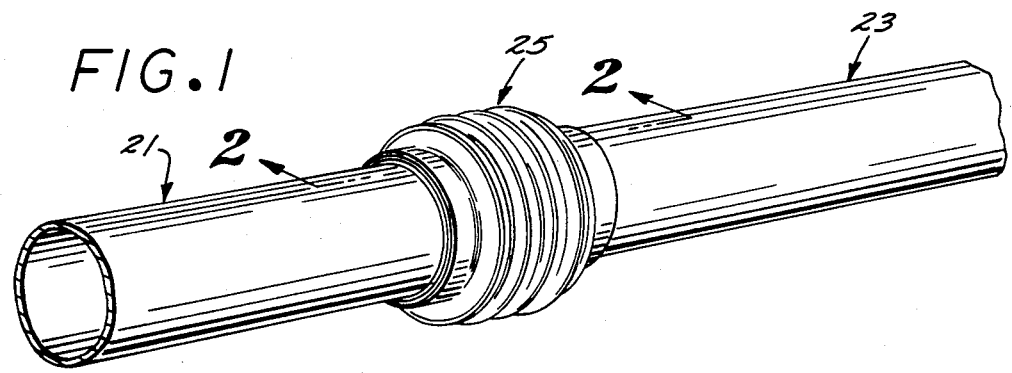
FIG. 1 is a perspective view of the present invention.
Figure 2:
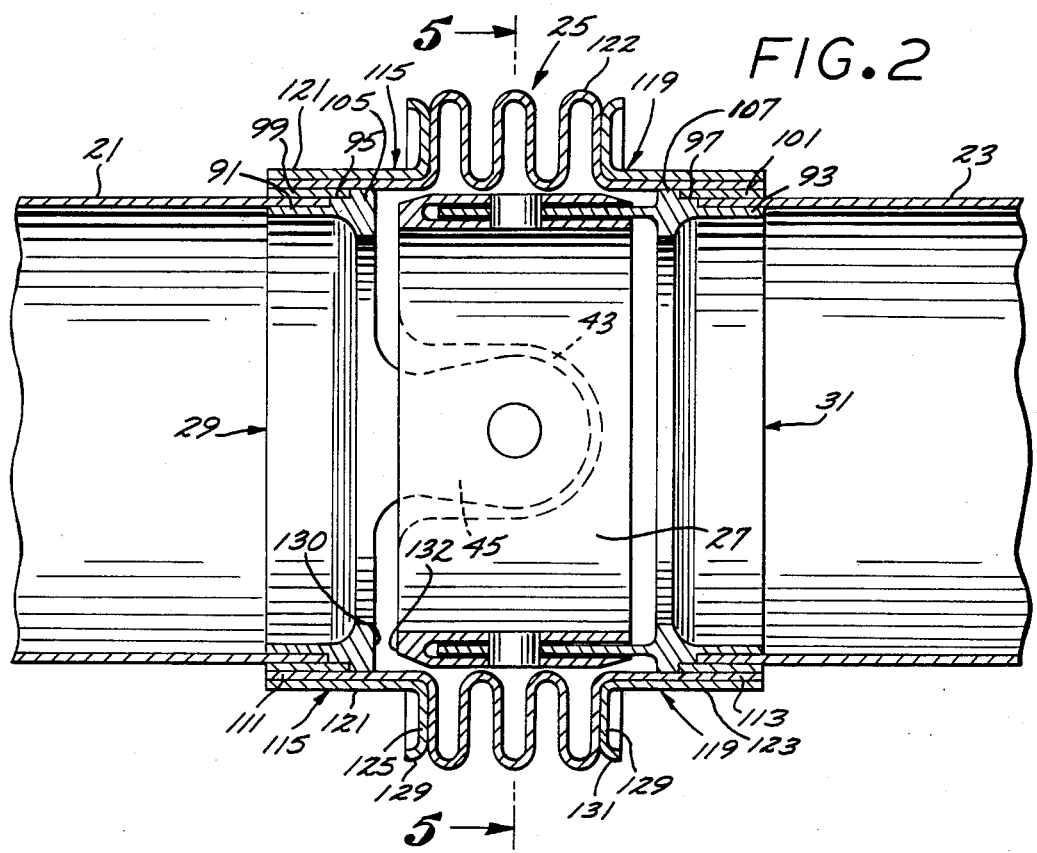
FIG. 2 is a longitudinal cross-section of the present invention along the line 2—2 of FIG. 1.
Figure 3:
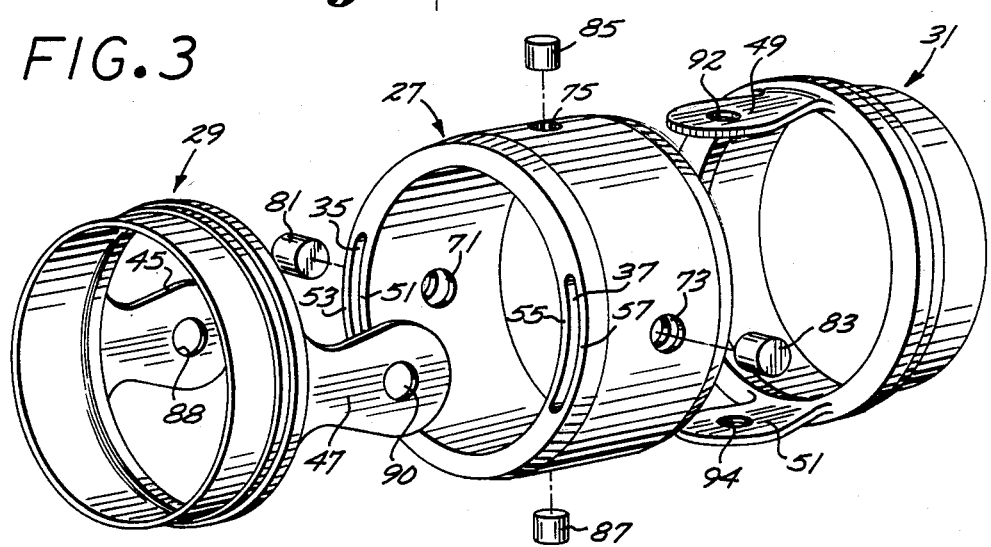
FIG. 3 is a exploded view of the present invention.

Referring to FIGS. 1 and 2, the gimbaled joint of the present invention is adapted for articulated interconnection of aircraft ducts 21 and 23 and is covered by means of a bellows assembly 25. Referring to FIGS. 2 and 3, the gimbaled joint includes a barrel shaped center ring, generally designated 27 having end rings, generally designated 29 and 31, disposed on the opposite sides thereof. The ring 27 is formed in its oppositely facing edges with respective pairs of axially extending, open-ended, arcuate slots 35, 37, 41 and 43 (FIG. 5). The end rings 29 and 31 are formed with respective pairs of diametrically disposed pairs of ears defining lobes 45, 47, 49 and 51. Thus, the gimble joint may be assembled by inserting the respective lobes 45 and 47 axially into the slots 43 and 37 and the lobes 49 and 51 into the respective slots 41 and 35, and securely pinning such lobes in position for rotation of the rings 29 and 31 about respective orthognal axes.

Referring to FIGS. 2 and 3, the center ring 27 may be of intergral construction and may be fabricated from metal or any other desirable materials. Referring to FIGS. 2 and 5, the center ring 27 is slightly longer than the lobes 45, 47, 49 and 51, and the slots 43 and 37 project inwardly from their open end to a point adjacent the opposite end thus projecting beyond the transverse center line of the ring itself. Referring to FIG. 2, it will be noted that the slots 35, 37, 39 and 41 are formed with semicircular blind ends to complement the semicircular shape formed by the end of the lobes 45, 47, 49 and 51. It will be appreciated that the slots 35, 37, 41 and 43 are formed with respective radially inner and outer wall segments 51 and 53, 55 and 57, 59 and 61 and, 63 and 65 between which the respective lobes 45, 47, 49 and 51 are sandwiched when the gimbal is in its assembled position shown in FIGS. 2 and 5.

Formed on perpendicular diameters of the barrel 27, corresponding with the centers of the slots, are radial bores 71, 73, 75 and 77 for receiving respective pivot pins 81, 83, 85 and 87, as best seen in FIG. 5.

Referring to FIG. 2, the end rings 29 and 31 are similarly constructed and are formed with respective necks 91 and 93 over which the ends of the respective ducts 21 and 23 telescope. The rings are then stepped up to respective larger diameters 95 and 97 over which respective annular retaining collars 99 and 101 are telescoped. Finally, the major diameter of the rings 29 and 31 are formed with respective flanges 105 and 107 over which the bellows assembly 25 may be inserted. The lobes 45, 47, 49 and 51 are arcuate in transverse cross-section to complement the arcuate shape of the respective slots 35, 37, 39 and 41.

The bellows assembly 25 is formed centrally with flexible convolutions 122 and is then neck down at its opposite ends to form neck sections 111 and 113 telescoped over the respective flanges 105 and 107. Telescoped over the necks 111 and 113 are support collars, generally designated 115 and 119. The support collars 115 and 119 are in the form of respective necks 121 and 123 which closely fit over the respective necks 111 and 113 of the bellows and then flare radially outwardly to form respective radial flanges 125 and 127 which abut axially against the confronting walls of the end convolutions 122 of the bellows to provide support against axially outwardly bulging thereof. The flanges 125 and 127 are preferrably turned back on themselves at the radially outer extremity to form annular reinforcing ribs 129 and 131.

In operation, it will be appreciated that the gimbaled joint of the present invention may be readily and conveniently fabricated, as by machining the slots 35, 37, 41 and 43 in the ends of the center ring 27. The formed end rings 29 and 31 may be moved into position to insert the respective lobes 45, 47, 49 and 51 into the respective slots. The pivot pins 81, 83, 85 and 87 may then be inserted into the respective bores 71, 73, 75 and 77 of the central ring and through the respective bores 88, 90, 92 and 94 of the lobes. The pins may then be welded into position thus securely securing the end rings 29 and 31 to the center ring 27.

The pivot pins project through the bores and the outside circumference 56 of the center ring, and are flush with the inside circumference 58 of the center ring, as shown in FIG. 5. In addition, the circumferences of the end rings and the inside circumference of the center ring are substantially equal to permit laminar fluid through the gimbal joint and minimize turbulence.

The exterior members, such as the collars 99 and 01, bellows assembly 25 and support collars 115 and 119 may then be telescoped over the respective ducts 21 and 23. The ends of the ducts 21 and 23 may be then telescoped onto the respective necks 91 and 93 of the end rings 29 and 31, and the retaining collars 99 and 101 shifted into the position shown in FIG. 2. The bellows assembly 25 may then be moved into position and the support collars 115 and 119 then telescoped into position. The assembly may then be welded together in the position shown.

Referring to FIG. 2, it will be appreciated that when the angular relationship between the ducts 21 and 23 is changed, the end rings 29 and 31 will be free to accommodate such angular change relative to the center ring 27. In the event the duct 21 shown in FIG. 2 is angled downwardly on the left end, the left hand ring 29 will rotate about a horizontal axes defined by the pivot pins 81 and 83. If such downward angling of the duct 21 is continued, the ring 29 will continue to rotate in a counterclockwise direction until the lower abutment surface 130 thereof facing to the right abuts the confronting left hand facing stop surface 132 limiting further rotation of the ring 29 relative to the center ring 27, as best seen in FIG. 6. In the event forces urge the duct 21 further downwardly to further tend to rotate the ring 29 in a counterclockwise direction, such rotation will be resisted by the retention forces on the respective pivot pins 81 and 83 to define the horizontal axis, as further resisted by the pivot pins 85 and 87 defining the vertical axis. It will be appreciated by those skilled in the art that the loads applied to the pivot pins 81, 83, 85 and 87 are essentially shear loads without significant bending forces. Consequently, such pins have proven to be capable of carrying significantly heavy loads without bending or deflection thereof and consequently avoiding distortion of the end rings 29 and 31 or the center ring 27 under load.

Referring to the gimbaled joint shown in FIG. 7, the construction thereof is similar to that for the gimble device shown in FIGS. 1 - 6, except that the center ring, generally designated 151, is constructed of concentric barrel like inner and outer rings 153 and 155. Received in annular spaced relation in the annular area between such inner and outer rings 153 and 155 are a plurality of arcuate spacers 157, 159, 161 and 163 disposed in the four quadrants. The spacers 157, 159, 161 and 163 are preferably riveted into position by means of respective rivets 171, 173, 175 and 177.

Various modifications and changes may be made with regard to the foregoing detailed description without departing from the spirit of the invention.

I claim:

1. A gimbaled joint apparatus for connecting fluid ducting comprising:
   an axially elongated central ring formed with axially oppositely facing first and second end faces and including concentric inner and outer tubes forming therebetween an annulus;
   a plurality of circumferential spacers disposed in said annulus, spaced circumferentially therearound to cooperate with said inner and outer tubes in forming therebetween two pairs of axial slots, the slots of the first pair being disposed on diametrically opposite sides of said central ring, each spanning a first diameter thereof and opening axially outwardly into said first end face, the slots of said second pair opening axially outwardly into said second end face and alos being disposed on diametrically opposite sides of said central ring and arranged to each span a second diameter of said central ring, said second diameter extending perpendicular to said first diameter;
   first and second end rings disposed at the opposite ends of said center ring and each formed with a pair of axially-elongated, diametrically spaced apart lobes received in said respective slots;
   first and second pairs of pivot pins projecting through said tubes and through said respective first and second pairs of lobes to pivotally connected said respective end rings to said central ring; and flexible, cylindrical enclosure means for surrounding and sealing said first and second end rings and said central rings.

2. A gimbaled joint apparatus in accordance with claim 1, wherein the inside circumference of said center ring is equal to the inside circumference of said end rings and said pivot pins are flush with the inside circumference of said center ring thereby permitting laminar flow through said gimbaled joint.

3. A gimbaled joint apparatus in accordance with claim 1, wherein said means for enclosing and sealing said first end ring, said second end ring and said center ring comprises a cylindrical flexible bellows.

4. A gimbaled joint apparatus for connecting fluid ducting and comprising:
   an axially-elongated central ring formed with axially oppositely facing first and second end faces;
   said cenrral ring being formed with a wall defining first and second pairs of circumferentially spaced apart slots, extending axially in said ring, said slots of said first pair being formed in the diametrically opposite sides of said central ring, each spanning a first diameter of said central ring and opening axially into said first face, said slots of said second pair opening axially into said second face and being formed on the diametrically opposite sides of said central ring and spanning a second diameter of rail ring, said second diameter extending perpendicular to said first diameter;
   first and second end rings disposed at the opposite ends of said central ring in confronting relationship with said respective first and second end faces, each being formed with a pair of axially-elongated, diametrically spaced apart lobes received in said respective pairs of slots;
   first and second pairs of pivot pins projecting downwardly through said wall and through said respective first and second pairs of lobes to cause said end rings, when lateral loads are applied thereto, to orbit through predetermined first and second arcuate paths relative to said central ring;
   said first and second end rings further being formed with a respective first and second annular stop surfaces aligned with and spaced from said respective first and second end faces, said end faces, annular stop surfaces and bores being so configured and arranged as to dispose said first and second faces of said central ring in said predetermined first and second predetermined paths to cause said first and second stop surfaces to limit the rotation of said end rings relative to said central ring; and
   flexible, cylindrical enclosure means defining a bellows for surrounding and sealing said first and second end rings and said central rings, whereby said central and end rings are enclosed within said bellows and when said end rings are pivoted through an arc about said respective pairs of pivot pins sufficient to engage said respective first and second abutment surfaces with said respective end faces, to place said respective pairs of pivot pins in shear.

5. A gimbaled joint apparatus in accordance with claim 4, wherein said center ring comprises an inner tube and an outer tube and includes spacers placed between and rigidly affixed to, the inner tube and the outer tube and said slots are formed between the spacers in said first end face and said second end face.

6. A gimbaled joint apparatus as set forth in claim 4 wherein:
   said central and end rings are cylindrical and of substantially the same diameter.

* * * * *